United States Patent
Yanagawa

(10) Patent No.: US 9,277,078 B2
(45) Date of Patent: Mar. 1, 2016

(54) INFORMATION PROCESSING APPARATUS WITH POWER CONTROL UNIT, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Katsuhiko Yanagawa, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 399 days.

(21) Appl. No.: 13/678,734

(22) Filed: Nov. 16, 2012

(65) Prior Publication Data

US 2013/0132747 A1 May 23, 2013

(30) Foreign Application Priority Data

Nov. 21, 2011 (JP) ................. 2011-253903

(51) Int. Cl.
| | |
|---|---|
| *G06F 1/32* | (2006.01) |
| *H04N 1/00* | (2006.01) |
| *G06F 1/26* | (2006.01) |
| *G06K 15/00* | (2006.01) |

(52) U.S. Cl.
CPC ............ *H04N 1/00901* (2013.01); *G06F 1/263* (2013.01); *G06F 1/3203* (2013.01); *G06K 15/4055* (2013.01); *H04N 1/00896* (2013.01); *H04N 1/00904* (2013.01); *H04N 2201/0094* (2013.01); *Y02B 60/1267* (2013.01)

(58) Field of Classification Search
USPC .......................................... 713/300, 310, 320
See application file for complete search history.

(56) References Cited

U.S. PATENT DOCUMENTS

| | | | |
|---|---|---|---|
| 8,253,384 B2* | 8/2012 | Chen ........................... | 320/137 |
| 8,464,079 B2* | 6/2013 | Chueh et al. ................. | 713/300 |

(Continued)

FOREIGN PATENT DOCUMENTS

| | | |
|---|---|---|
| CN | 1530795 A | 9/2004 |
| CN | 1971545 A | 5/2007 |
| CN | 1975609 A | 6/2007 |
| JP | 2004074558 A | 3/2004 |

(Continued)

OTHER PUBLICATIONS

Official Action issued in CN201210473388.8 mailed Nov. 2, 2014. English translation provided.

(Continued)

*Primary Examiner* — Zahid Choudhury
(74) *Attorney, Agent, or Firm* — Rossi, Kimms & McDowell LLP

(57) ABSTRACT

An information processing apparatus that is capable of reducing power consumption. A power supply unit supplies electric power to devices including first and second devices of the apparatus. A power-state-switching unit switches a power state of the apparatus among a first power state in which the power supply unit supplies power to the devices, a second power state in which the power supply unit does not supply power to the first device without supplying power from a secondary battery to the devices, and a third power state in which the secondary battery supplies power to the second device. A control unit controls so that the secondary battery is charged by the power supplied from the power supply unit in the first power state, and to control so that the secondary battery is not charged by the power supplied from the power supply unit in the second and third power states.

11 Claims, 8 Drawing Sheets

(56) References Cited

U.S. PATENT DOCUMENTS

| | | | |
|---|---|---|---|
| 8,751,835 B2* | 6/2014 | Lee et al. | 713/300 |
| 2004/0260957 A1* | 12/2004 | Jeddeloh et al. | 713/300 |
| 2007/0106916 A1 | 5/2007 | Yanagawa | |
| 2007/0122174 A1* | 5/2007 | Yamamoto | 399/88 |
| 2011/0219251 A1* | 9/2011 | Onishi | 713/323 |
| 2011/0264937 A1* | 10/2011 | Meisner et al. | 713/323 |
| 2012/0054479 A1* | 3/2012 | Park | 713/2 |

FOREIGN PATENT DOCUMENTS

| | | |
|---|---|---|
| JP | 2007-062243 A | 3/2007 |
| JP | 2011159063 A | 8/2011 |
| JP | 2011229274 A | 11/2011 |

OTHER PUBLICATIONS

Office Action issued in JP2011-253903, mailed Oct. 6, 2015.

* cited by examiner

FIG. 3

| STATE\TIME (0 TO 59 MINUTES) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| OFF(%) | 100 | 100 | 100 | 100 | 100 | 100 | 100 | 100 | 5 | 5 | 5 | 5 | 5 | 5 | 5 | 5 | 5 | 5 | 5 | 5 | 5 | 5 | 100 | 100 |
| SLEEP(%) | 0 | 0 | 0 | 0 | 0 | 0 | 0 | 0 | 65 | 55 | 45 | 55 | 75 | 55 | 45 | 45 | 55 | 65 | 75 | 75 | 75 | 75 | 0 | 0 |
| STANDBY(%) | 0 | 0 | 0 | 0 | 0 | 0 | 0 | 0 | 20 | 25 | 30 | 25 | 15 | 25 | 30 | 30 | 25 | 20 | 15 | 15 | 15 | 15 | 0 | 0 |
| OPERATING(%) | 0 | 0 | 0 | 0 | 0 | 0 | 0 | 0 | 10 | 15 | 20 | 15 | 5 | 15 | 20 | 20 | 15 | 10 | 5 | 5 | 5 | 5 | 0 | 0 |
| STANDBY + OPERATING(%) | 0 | 0 | 0 | 0 | 0 | 0 | 0 | 0 | 30 | 40 | 50 | 40 | 20 | 40 | 50 | 50 | 40 | 30 | 20 | 20 | 20 | 20 | 0 | 0 |

INFORMATION PROCESSING APPARATUS WITH POWER CONTROL UNIT, CONTROL METHOD THEREFOR, AND STORAGE MEDIUM STORING CONTROL PROGRAM THEREFOR

BACKGROUND OF THE INVENTION

1. Field of the Invention

The present invention relates to an information processing apparatus that is provided with a power control unit, a control method therefor, and a storage medium storing a control program therefor.

2. Description of the Related Art

Generally, an image forming apparatus (for example, a printer or a multifunctional peripheral device) that is one of information processing apparatuses is provided with a power control unit for controlling the power consumption.

The power control unit makes the image forming apparatus shift from a standby state to a sleep mode with less power consumption than the standby state, when a predetermined condition is satisfied (when a predetermined time elapsed, for example) after the image forming apparatus enters the standby state. This reduces the power consumption of the image forming apparatus (power-saving).

Japanese Laid-Open Patent Publication (Kokai) No. 2007-62243 (JP 2007-62243A) discloses an image forming apparatus that supplies electric power to sections that are necessary to operate in the sleep mode (an IO control ASIC, an operation panel, an I/F circuit, for example) using a secondary battery (a rechargeable battery) in order to reduce the power consumption in the sleep mode.

The image forming apparatus disclosed in the publication charges the secondary battery when remaining battery power lowers regardless of the state of the image forming apparatus.

The image forming apparatus converts commercial power (AC power) into DC power by a power supply circuit and supplies it to respective internal units. For example, the power supply circuit converts the AC power of which voltage varies between 100 V and 230 V depending on a nation or an area into the DC power in low voltages, such as 3.3 V, 5 V, and 12 V. Then, the DC current is used to charge the secondary battery, too.

AC/DC conversion efficiency decreases as the power consumption in the image forming apparatus decreases in general. Accordingly, when the secondary battery is charged regardless of the state of the image forming apparatus (the state of the power consumption) as disclosed in JP 2007-62243A, the total power consumption including the power used for charging the secondary battery increases.

SUMMARY OF THE INVENTION

The present invention provides an information processing apparatus with a power control unit, a control method therefor, and a storage medium storing a control program therefor, which are capable of reducing power consumption.

Accordingly, a first aspect of the present invention provides an information processing apparatus that operates in a first power state, a second power state of which electric energy consumption is smaller than the first power state, or a third power state of which electric energy consumption is smaller than the second power state, comprising a power supply unit configured to supply electric power to devices including first and second devices of the information processing apparatus, a secondary battery configured to supply charged power to a part of the devices, a power-state-switching unit configured to switch a power state of the information processing apparatus among the first power state in which the power supply unit supplies power to the devices, the second power state in which the power supply unit does not supply power to the first device without supplying power from the secondary battery to the devices, and the third power state in which the secondary battery supplies power to the second device, and a control unit configured to control so that the secondary battery is charged by the power supplied from the power supply unit in the first power state, and to control so that the secondary battery is not charged by the power supplied from the power supply unit in the second and third power states.

Accordingly, a second aspect of the present invention provides a control method for an information processing apparatus that operates in a first power state, a second power state of which electric energy consumption is smaller than the first power state, or a third power state of which electric energy consumption is smaller than the second power state, the control method comprising a step of supplying electric power to devices including first and second devices of the information processing apparatus from a power supply unit, a step of supplying electric power to a part of the devices from a secondary battery that is charged by the power supply unit, a step of switching a power state of the information processing apparatus among the first power state in which the power supply unit supplies power to the devices, the second power state in which the power supply unit does not supply power to the first device without supplying power from the secondary battery to the devices, and the third power state in which the secondary battery supplies power to the second device, and a step of controlling so that the secondary battery is charged by the power supplied from the power supply unit in the first power state, and controlling so that the secondary battery is not charged by the power supplied from the power supply unit in the second and third power states.

Accordingly, a third aspect of the present invention provides a non-transitory computer-readable storage medium storing a control program causing a computer to execute the control method of the second aspect.

According to the present invention, since the secondary battery is charged when the conversion efficiency of the power supply circuit is larger than a predetermined threshold value, the total power consumption including the power used for charging the secondary battery can be reduced.

Further features of the present invention will become apparent from the following description of exemplary embodiments with reference to the attached drawings.

BRIEF DESCRIPTION OF THE DRAWINGS

FIG. 3 is a view showing an example of one-day variation of working states of the image forming apparatus.

DESCRIPTION OF THE EMBODIMENTS

Hereafter, embodiments according to the present invention will be described in detail with reference to the drawings.

Figure 1:
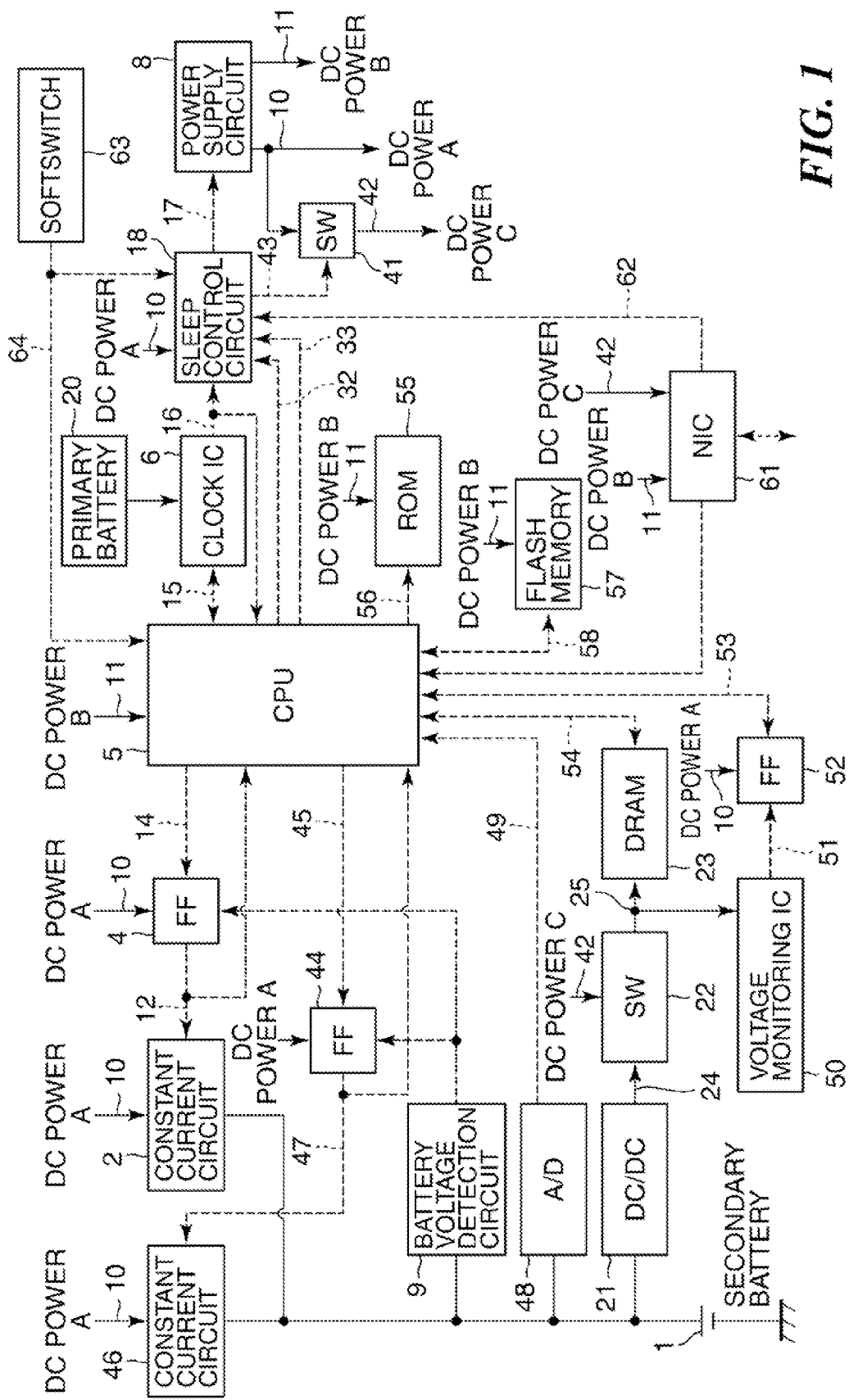
FIG. 1 is a block diagram showing an example of an power control unit included in an information processing apparatus according to a first embodiment of the present invention.

FIG. 1 is a block diagram showing an example of an power control unit included in an information processing apparatus according to a first embodiment of the present invention. It should be noted that the illustrated power control unit is used in an image forming apparatus that is one of information processing apparatuses, for example.

The image forming apparatus has the following four states (modes). (1) An operating state in which the image forming apparatus prints, scans, etc. (an operating mode, a first power state). (2) A standby state in which power consumption is smaller than that in the operating state, and in which the image forming apparatus can print and scan immediately (a standby mode, the first power state). (3) A sleep state in which power consumption is smaller than that in the standby state, and in which an operation of a CPU in the image forming apparatus stops (a sleep mode, a second power state). (4) An off-state in which power consumption is smaller than that in the sleep state (an off-mode, a third power state).

In the standby state, a power supply circuit 8 connected to a commercial power source (AC power) supplies DC power A10, DC power B11, and DC power C42 to devices (loads) of the image forming apparatus. Specifically, the power supply circuit 8 supplies DC power to devices, such as a sleep control circuit 18, a constant current circuit 2, a constant current circuit 46, a nonvolatile memory 57, a ROM 55, a CPU 5, a DRAM (a volatile memory) 23, a NIC (a network control IC) 61, in the standby mode.

In the sleep state, the power supply circuit 8 supplies the DC power A10 and the DC power C42 to devices of the image forming apparatus. Specifically, the power supply circuit 8 supplies DC power to devices, such as the sleep control circuit 18, the constant current circuit 2, the constant current circuit 46, the DRAM 23, the NIC 61, in the sleep mode.

In the off-state, the power supply circuit 8 supplies the DC power A10 to devices of the image forming apparatus. Specifically, the power supply circuit 8 supplies DC power to devices, such as the sleep control circuit 18, the constant current circuit 2, the constant current circuit 46, in the off-state. The electric power is not supplied to the NIC 61 in the off-state. In the off-state, the power supply from the DC power C42 to the DRAM 23 is stopped, and the DC power is supplied from a secondary battery 1.

In FIG. 1, the image forming apparatus has the secondary battery 1, which can be used repeatedly by charge. The secondary battery 1 is a lithium ion battery or a nickel hydride battery, for example.

The power supply circuit (power conversion unit) 8 converts AC power supplied from the outside into DC power by AC/DC conversion. Here, the DC power A10 and the DC power B11 are generated from the AC power.

The DC power A10 is always outputted as long as the AC power is supplied. On the other hand, the DC power B11 is stopped when the image forming apparatus enters into the sleep state or the off-state.

Incidentally, when the DC power A10 and the DC power B11 are generated from the AC power, conversion efficiency will not become 100% due to a loss of the AC/DC conversion. The smaller the power consumption in the image forming apparatus is, the lower the conversion efficiency is.

Figure 2:
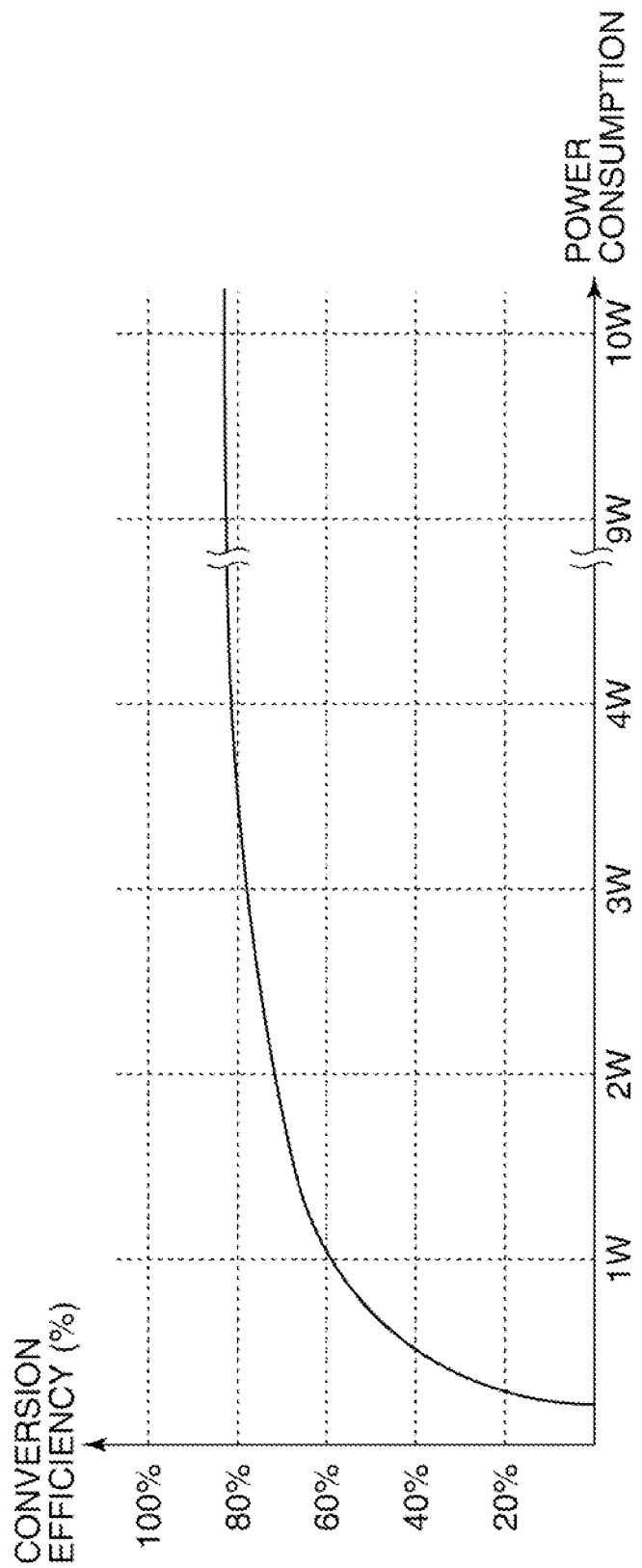
FIG. 2 is a graph showing conversion efficiency of a power supply circuit shown in FIG. 1 when converting AC power into DC power.

FIG. 2 is a graph showing the conversion efficiency of the power supply circuit 8 shown in FIG. 1 when converting AC power into DC power.

In FIG. 2, the vertical axis shows the conversion efficiency and the horizontal axis shows the power consumption of the image forming apparatus. The power consumption of the image forming apparatus in the sleep state is about 1 W and the conversion efficiency is about 60%.

The power consumption of the image forming apparatus in the standby state or the operating state is 4 W or more and the conversion efficiency is about 80%. Thus, the smaller the power consumption is, the lower the conversion efficiency is.

When the image forming apparatus is in the operating state or the standby state, i.e., when the conversion efficiency of the AC/DC conversion is higher than a predetermined efficiency, the CPU 5 charges the secondary battery 1 as mentioned later.

A switch (SW) 41 is controlled by the sleep control circuit 18 to supply or cut off (turn ON or OFF) the DC power A10. The SW 41 consists of an FET, for example.

When the SW 41 keeps the ON state, the SW 41 outputs the DC power C42 of which voltage is equal to that of the DC power A10. The sleep control circuit 18 turns OFF the SW 41 when the image forming apparatus is in the off-state and suspends the output of the DC power C42.

The DC power A10 is supplied to the constant current circuit 2. The constant current circuit 2 generates constant current corresponding to the DC power A10, and supplies the constant current to the secondary battery 1. That is, when turning ON, the constant current circuit 2 supplies the constant current to the secondary battery 1. The constant current circuit 2 comprises a transistor, a resistor, etc. In the illustrated example, the constant current circuit 2 supplies the constant current of 100 mA.

The constant current circuit 46 is provided with the same configuration as the constant current circuit 2, and the DC power A10 is supplied. The constant current circuit 46 can supply twice the constant current of the constant current circuit 2. In the illustrated example, the constant current circuit 46 supplies the constant current of 200 mA to the secondary battery 1.

The DC power A10 is supplied to flip-flops (FF) 4, 44, and 52, which keep states set by the CPU 5. Then, the FF 4 outputs a constant-current-circuit-control signal 12 for controlling the constant current circuit 2.

When the constant-current-circuit-control signal 12 is ON (high (H) level), the constant current circuit 2 enters into a charging mode for supplying current to the secondary battery 1. When the constant-current-circuit-control signal 12 is OFF (low (L) level), the constant current circuit 2 stops supplying the current to the secondary battery 1 and enters into a self-discharging mode. It should be noted that the FF 4 holds the value set up as long as the DC power A10 is supplied.

The FF 44 outputs a constant-current-circuit-control signal 47 for controlling the constant current circuit 46. Then, the constant current circuit 46 operates depending on the constant-current-circuit-control signal 47 in the same manner as the constant current circuit 2.

The CPU 5 controls the power control unit and the image forming apparatus. The DC power B11 is supplied to the CPU 5. The ROM 55, the DRAM 23, and the nonvolatile memory 57 are connected to the CPU 5 with a bus connection. Then, the ROM 55 stores a boot program for the CPU 5.

The DC power B11 is supplied to the nonvolatile memory 57. The nonvolatile memory 57 is an electrically rewritable memory like a flash memory etc., and data is rewritten by the CPU 5.

The nonvolatile memory 57 stores a control program for the image forming apparatus and the operation information about the image forming apparatus mentioned later.

It should be noted that the operation information about the image forming apparatus shows average rates of the four working states (the operating state, the standby state, the sleep state, and the off-state) after the image forming apparatus is activated.

FIG. 3 is a view showing an example of one-day variation of the working states of the image forming apparatus.

FIG. 3 shows the hourly working states (average rates (%)) of the image forming apparatus on Monday. That is, the operating information is stored into the nonvolatile memory 57 every predetermined time. As illustrated, the working state of the image forming apparatus is 100% off-state from 0:00 to 7:00, and from 22:00 to 24:00. In the period from 8:00 to 21:00, the working states comprise 5% off-state, 45% through 75% sleep state, 15% through 30% standby state, and 5% operating state.

The control program for the image forming apparatus is developed onto the DRAM 23 (the main memory unit) from the nonvolatile memory 57. Then, the CPU 5 executes the control program developed onto the DRAM 23. The DRAM 23 is used for storing image data and as a work memory of the CPU 5.

DC power 25 outputted from a SW 22 mentioned below is supplied to the DRAM 23, and the DRAM 23 holds data in a self refreshment mode with small power consumption when the image forming apparatus is in the sleep state or the off-state.

Since the power consumption of the CPU 5 is comparatively large, the DC power B11 supplied to the CPU 5 is stopped when the image forming apparatus enters in the sleep state.

A clock IC 6 is connected to the CPU 5, and a primary battery 20 supplies power to the clock IC 6. The primary battery 20 is a dry cell or a lithium cell, for example. The clock IC 6 operates until the primary battery 20 is exhausted irrespective of ON/OFF of the power supply circuit 8.

The clock IC 6 is provided with an alarm function for outputting an interrupt signal at set-up time and a timer function for outputting an interrupt signal after elapsing a set-up period, in addition to the function for providing current date, a day of week, and time.

A battery voltage detection circuit 9 detects voltage of the secondary battery 1. When detecting the voltage (for example, 1.5V) that is ascribed to overcharge of the secondary battery 1, the battery voltage detection circuit 9 resets the FF 4 and the FF 44, and turns off the constant current circuits 2 and 46. The battery voltage detection circuit 9 comprises a comparator etc.

An analog/digital (A/D) converter 48 converts analog information showing the voltage of the secondary battery 1 into a digital signal, and gives it to the CPU 5. A DC/DC converter 21 generates backup power 24 for the DRAM 23 by using the secondary battery 1 as a power supply.

The SW 22 switches the DC power C42 and the backup power 24. When the DC power C42 is ON, the SW 22 selects the DC power C42 and outputs it as the DC power 25. On the other hand, when the DC power C42 is OFF, the SW 22 selects the backup power 24 and outputs it as the DC power 25.

A voltage monitoring IC 50 monitors the voltage of the DC power 25 outputted from the SW 22. When detecting that the voltage of the DC power 25 decreases below the predetermined voltage (for example, 2.4V) on which the DRAM 23 cannot operate, the voltage monitoring IC 50 resets the FF 52.

The CPU 5 reads a setting and the clock information of the clock IC 6 by an interface signal 15. If clock IC 6 becomes the alarm time set up by the CPU 5, it will output the alarm interrupt signal 16. Then, when receiving the alarm interrupt signal 16, the sleep control circuit 18 controls the power supply as it may mention later. The alarm interrupt signal 16 is given to the CPU 5, too.

The NIC (an external interface) 61 controls communications between the image forming apparatus and an external apparatus (not shown) connected via the network. When the image forming apparatus is in the sleep state, the DC power B11 is stopped, and only the DC power C42 is supplied to the NIC 61. That is, the supplied power to the NIC 61 decreases in the sleep state.

Then, the NIC 61 suspends the communications with the CPU 5, and only monitors the network. When receiving a packet (data) addressed to the image forming apparatus, the NIC 61 notifies the packet concerned to the sleep control circuit 18.

When a softswitch 63 is depressed in the sleep state or the off-state, an interrupt signal 64 is inputted to the sleep control circuit 18. When the softswitch 63 is depressed in the standby state, the interrupt signal 64 is inputted to the CPU 5.

When receiving the interrupt signal 64 from the softswitch 63, the CPU 5 outputs a shift-to-sleep signal 32 or a shift-to-off signal 33 to the sleep control circuit 18. Depending on the depression time of the softswitch 63, i.e., the period of the interrupt signal 64, one of the shift-to-sleep signal 32 and the shift-to-off signal 33 is outputted.

For example, when the depression time of the softswitch 63 is less than 1 second, the CPU 5 outputs the shift-to-sleep signal 32. On the other hand, when the depression time of the softswitch 63 is 1 second or more, the CPU 5 outputs the shift-to-off signal 33.

Figure 4:
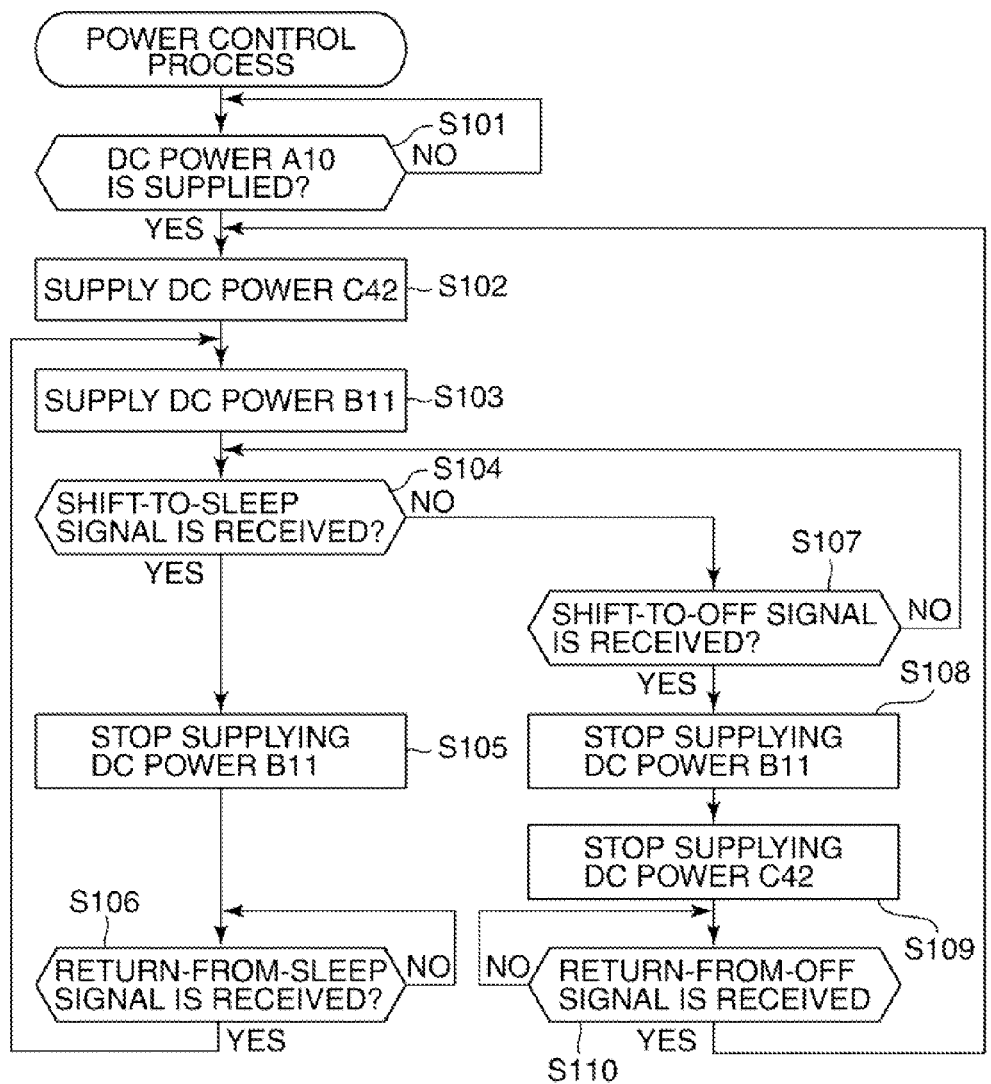
FIG. 4 is a flowchart showing a power control process executed by a sleep control circuit shown in FIG. 1.

FIG. 4 is a flowchart showing a power control process executed by the sleep control circuit 18 shown in FIG. 1.

A user determines whether turning ON the power supply circuit 8 in the image forming apparatus (step S101). When the power supply circuit 8 is not turned ON (NO in the step S101), the DC power A10 is not supplied to the sleep control circuit 18. When the power supply circuit 8 is turned ON (YES in the step S101), the DC power A10 is supplied to the sleep control circuit 18.

When the DC power A10 is supplied to the sleep control circuit 18, the sleep control circuit 18 turns ON the SW 44 by a switch control signal 43, and supplies the DC power C42 (step S102). Next, the sleep control circuit 18 controls the power supply circuit 8 by the power control signal 17 so as to supply the DC power B11 (step S103).

After supplying the DC power B11, the sleep control circuit 18 determines whether the shift-to-sleep signal 32 is received from the CPU 5 (step S104). When receiving the shift-to-sleep signal 32 (YES in the step S104), the sleep control circuit 18 controls the power supply circuit 8 by the power control signal 17 so as to stop supplying the DC power B11 (step S105) to shift the image forming apparatus to the sleep state.

Since the DC power B11 is cut off in the sleep state, the CPU 5 with large power consumption etc. are turned off, and the power consumption of the image forming apparatus decreases.

Next, the sleep control circuit 18 determines whether the return-from-sleep signal is received (step S106). The return-from-sleep signal is the interrupt signal 64 from the softswitch 63 or the interrupt signal 62 from the NIC 61, for example.

While the return-from-sleep signal is not received (NO in the step S106), the sleep control circuit 18 waits. On the other hand, when receiving the return-from-sleep signal (YES in the step S106), the sleep control circuit 18 returns the process to the step S103, and supplies the DC power B11. This returns the image forming apparatus to the standby state from the sleep state.

When not receiving the shift-to-sleep signal 32 (NO in the step S104), the sleep control circuit 18 determines whether the shift-to-off signal 33 is received from the CPU 5 (step S107). When the shift-to-off signal 33 is not received (NO in the step S107), the sleep control circuit 18 returns the process to the step S104.

On the other hand, when receiving the shift-to-off signal 33 (YES in the step S107), the sleep control circuit 18 controls the power supply circuit 8 by the power control signal 17 so as to stop supplying the DC power B11 (step S108). Next, the sleep control circuit 18 controls the SW 41 by the switch control signal 43 so as to stop supplying the DC power C42 (step S109). This shifts the image forming apparatus to the off-state.

When the DC power C42 is cut off, the SW 22 selects the DC/DC converter 21 (i.e., the secondary battery 1) as the backup power 24, and gives the backup power 24 to the DRAM 23 as the DC power 25. This starts to back up the DRAM 23 by the secondary battery 1.

Since the DC power B11 and the DC power C42 turn off, the NIC 61 enters into the off-state completely and the network communication function is stopped.

Thus, the secondary battery 1 supplies the power to the DRAM 23 to save data etc. in the off-state. Then, since the NIC 61 turns off completely, the power consumption is reduced in the off-state than in the sleep state.

Next, the sleep control circuit 18 determines whether the return-from-off signal is received (step S110). The return-from-off signal is the interrupt signal 64 from the softswitch 63 or the interrupt signal 16 from the clock IC 6, for example.

While the return-from-off signal is not received (NO in the step S110), the sleep control circuit 18 waits. On the other hand, when receiving the return-from-off signal (YES in the step S110), the sleep control circuit 18 returns the process to the step S102, and controls the SW 41 to supply the DC power C42. Next, the sleep control circuit 18 supplies the DC power B11, and returns the image forming apparatus to the standby state.

Figure 5A:
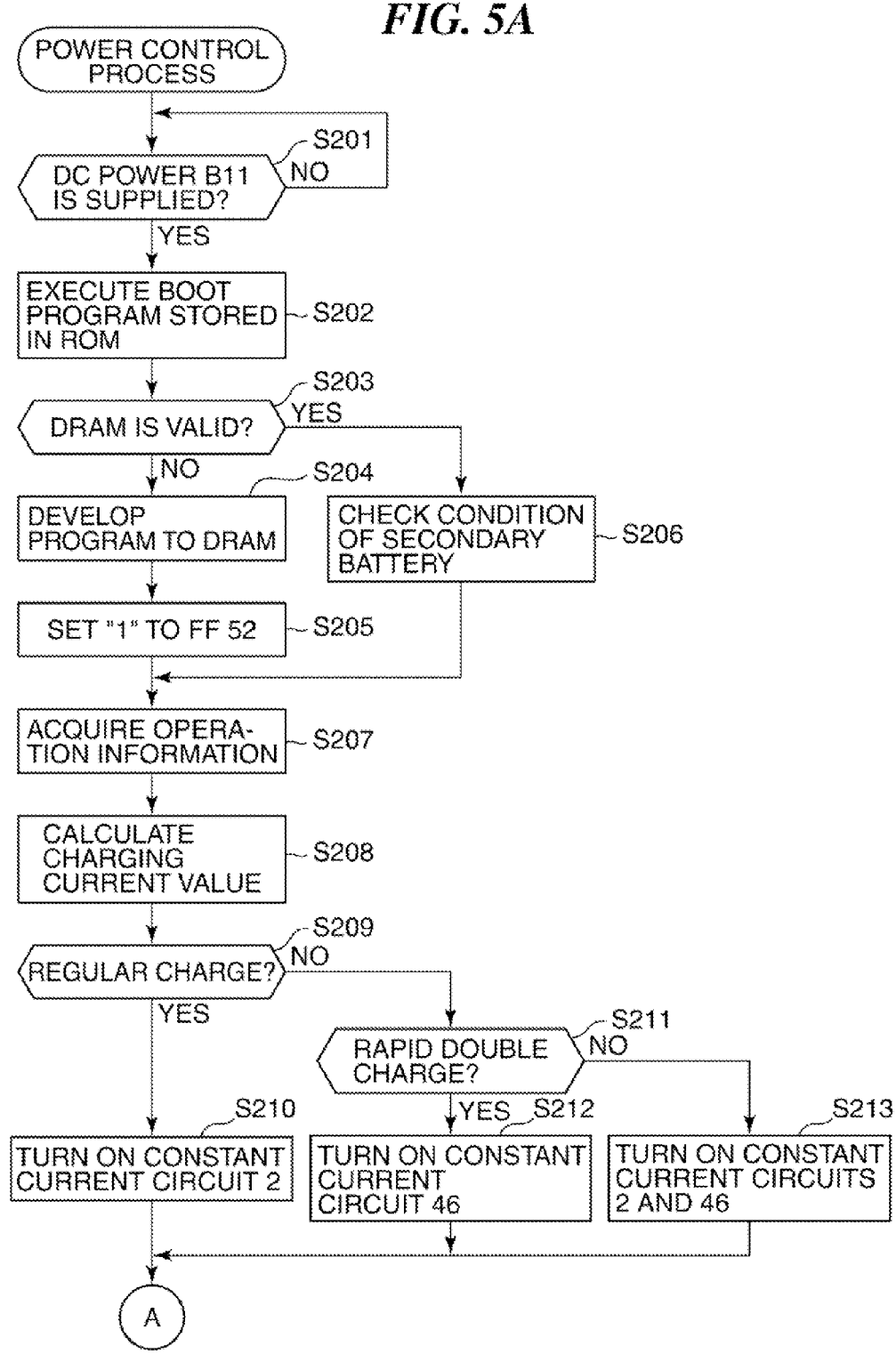
FIG. 5A is a flowchart showing a part of a power control process executed by a CPU shown in FIG. 1.
Figure 5B:
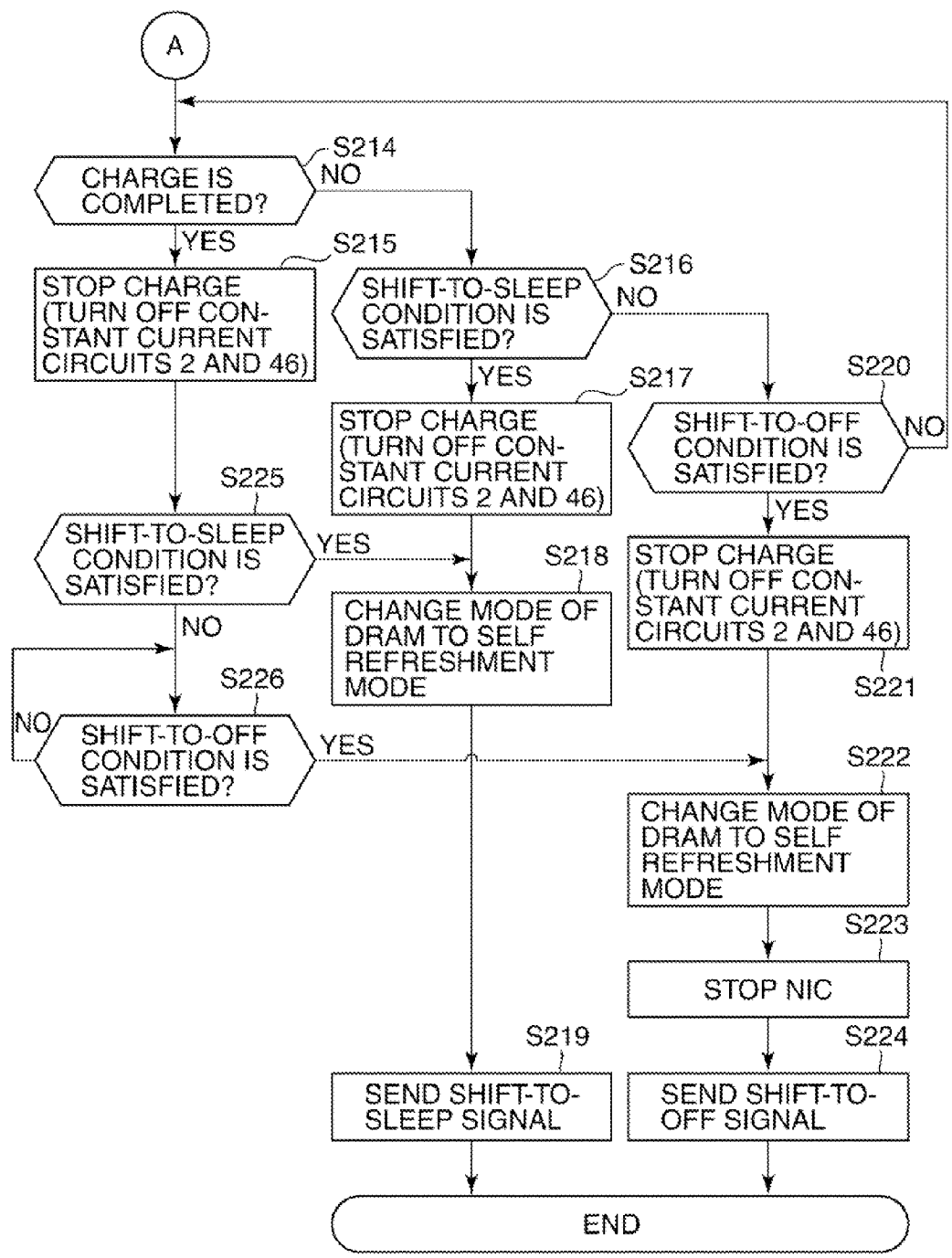
FIG. 5B is a flowchart showing the remaining part of the power control process executed by the CPU shown in FIG. 1.

FIG. 5A and FIG. 5B are flowcharts showing an example of the power control process executed by the CPU 5 shown in FIG. 1.

As shown in FIG. 4, when the sleep control circuit 18 supplies the DC power A10, the power supply circuit 8, which is controlled by the power control signal 17, supplies the DC power B11. When the DC power B11 is not supplied (NO in the step S201), the CPU 5 does not operate.

When the DC power B11 is supplied (YES in the step S201), the CPU 5 executes the boot program stored in the ROM 55 (step S202). Next, the CPU 5 refers to the FF 52 and determines whether the data stored in the DRAM 23 is valid (step S203).

When "1" is set to the FF 52, the CPU 51 determines that the data stored in the DRAM 23 is valid.

When determining that the data stored in the DRAM 23 is invalid (NO in the step S203), the CPU 5 reads a control program from the nonvolatile memory (flash memory) 57, and develops the control program to the DRAM 23 (step S204). Then, the CPU 5 sets "1" to the FF 52 by a set signal 53 in order to show that the data in the DRAM 23 is valid.

On the other hand, when determining that the data stored in the DRAM 23 is valid (YES in the step S203), the CPU 5 acquires the voltage information about the secondary battery 1 via the A/D converter 48, and presumes the remaining capacity (Pbat) of the secondary battery 1 (step S206). That is, the CPU 5 checks the condition of the secondary battery 1.

It should be noted that the remaining capacity (Pbat) of the secondary battery 1 is presumed "0" when the data stored in the DRAM 23 is determined to be invalid.

Next, the CPU 5 acquires the operation information about the image forming apparatus from the nonvolatile memory 57 (step S207). It should be noted that the CPU 5 executes the process in the step S207 after the process in the step S205 or the step S206.

The CPU 5 acquires the time (Ton) between the current time and the time when the image forming apparatus will shift to the off-state next time, and acquires the total rate R (%) of the rate of the standby state and the rate of the operating state during the time period, from the operating information. Then, the CPU 5 calculates the total time (Trun) of the standby state and the operating state according to (1) based on a formula the time (Ton) and the total rate R concerned.

$$Trun=Ton*R/100 \tag{1}$$

The CPU 5 acquires a period (Toff) of the next off-state and a current value (Ibackup) consumed when the DRAM 23 is backed up, from the operating information. Then, the CPU 5 calculates the electric energy (Pbackup) required to back up according to a formula (2) based on the off-state period (Toff) and the current value (Ibackup).

$$Pbackup=Ibackup*Toff \tag{2}$$

A condition (3) needs to be satisfied in order to back up the DRAM 23. Then, the CPU 5 calculates a charging current value (Icharge) based on the condition (3) (step S208).

$$Pbackup<Pbat+Icharge*Trun \tag{3}$$

It should be noted that the current value (Ibackup) required to back up the DRAM 23 has been stored in the ROM 55 beforehand when the configuration of the DRAM mounted on the image forming apparatus is fixed.

On the other hand, when the configuration of the DRAM mounted is not fixed, information showing relationship between a configuration and consuming current value is beforehand stored in the ROM 55.

When the configuration of the DRAM is not fixed as a case using a DIMM (Dual In-Line Memory Module), the information for acquiring the configuration is also stored in a nonvolatile memory like an EEPROM (Electrically Erasable Programmable Read-Only Memory) on the DIMM.

Next, the CPU 5 compares the charging current value (Icharge) with the current value of the constant current circuit 2, and determines whether the charging current value is smaller than the current value of the constant current circuit 2 (step S209). When the charging current value (for example, 50 mA) is smaller than the current value (100 mA) of the constant current circuit 2, i.e., when it is a regular charge (YES in the step S209), the CPU 5 sets a predetermined value (for example, "1") to the FF 4 by a set signal 14. As a result of this, the CPU 5 turns ON the constant current circuit 2 to start the regular charge of which the current value is 100 mA (step S210).

On the other hand, when the charging current value (for example, 150 mA) is not smaller than the current value of the constant current circuit 2 (NO in the step S209), the CPU 5 compares the charging current value (Icharge) with the current value (200 mA) of the constant current circuit 46, and determines whether the charging current value is smaller than the current value of the constant current circuit 46 (step S211).

When the charging current value is smaller than the current value of the constant current circuit 46, i.e., when it is a rapid double charge (YES in the step S211), the CPU 5 sets a predetermined value (for example, "1") to the FF 44 by a set signal 45. As a result of this, the CPU 5 turns ON the constant current circuit 46 to start the rapid double charge of which the current value is 200 mA (step S212).

When the charging current value (for example, 250 mA) is not smaller than the current value of the constant current circuit 46 (NO in the step S211), the CPU 5 sets a predetermined value to the FF 4 and the FF 44 to turn on the constant current circuits 2 and 46 (step S213). As a result of this, the CPU 5 starts a rapid triple charge of which the current value is 300 mA (step S213).

Next, the CPU 5 determines whether the charge of the secondary battery 1 has been completed (step S214). The CPU 5 determines the completion of the charge based on the voltage of the secondary battery 1 and the charge time.

When determining that the charge of the secondary battery 1 has been completed (YES in the step S214), the CPU 5 resets the FF 4 and the FF 44 to turn off the constant current circuits 2 and 46 (step S215). As a result of this, the CPU 5 stops the charge to the secondary battery 1.

On the other hand, when determining that the charge of the secondary battery 1 has not been completed (NO in the step S214), the CPU 5 determines whether the shift-to-sleep condition (a first shift condition) is satisfied (step S216). Here, the CPU 5 determines that the shift-to-sleep condition is satisfied, when the alarm interrupt signal 16 is received from the clock IC 6 or when the interrupt signal 64 is received from the softswitch 63.

It should be noted that the clock IC 6 generates the alarm interrupt signal 16 at the alarm time set up by the CPU 5, as mentioned above. The interrupt signal 64 is generated when the softswitch 63 is depressed less than 1 second.

When the shift-to-sleep condition is satisfied (YES in the step S216), the CPU 5 resets the FF 4 and the FF 44 to turn off the constant current circuits 2 and 46 (step S217). As a result of this, the CPU 5 stops the charge to the secondary battery 1.

Next, the CPU 5 sets the DRAM 23 in a self refreshment mode (step S218). Next, the CPU 5 sends the shift-to-sleep signal 32 to the sleep control circuit 18 (step S219). Then, the CPU 5 finishes the power control process. When receiving the shift-to-sleep signal 32, the sleep control circuit 18 executes the power control process shown in FIG. 4.

When the shift-to-sleep condition is not satisfied (NO in the step S216), the CPU 5 determines whether a shift-to-off condition (a second shift condition) is satisfied (step S220). Here, the CPU 5 determines that the shift-to-off condition is satisfied when shift-to-off time (timer count) set to the clock IC 6 elapses, or when the softswitch 63 is depressed 1 second or more.

When the shift-to-off condition is not satisfied (NO in the step S220), the CPU 5 returns the process to the step S214. On the other hand, when the shift-to-off condition is satisfied (YES in the step S220), the CPU 5 resets the FF 4 and the FF 44 to turn off the constant current circuits 2 and 46 (step S221). As a result of this, the CPU 5 stops the charge to the secondary battery 1.

Next, the CPU 5 sets the DRAM 23 in the self refreshment mode (step S222). Then, the CPU 5 controls the NIC 61 to stop the network communications (step S223). Next, the CPU 5 sends the shift-to-off signal 33 to the sleep control circuit 18 (step S224), and finishes the power control process.

It should be noted that the CPU 5 determines whether the shift-to-sleep condition is satisfied (step S225) after turning off the constant current circuits 2 and 46 in the step S215. Then, when the shift-to-sleep condition is satisfied (YES in the step S225), the CPU 5 proceeds with the process to the step S218, and sets the DRAM 23 in the self refreshment mode.

When the shift-to-sleep condition is not satisfied (NO in the step S225), the CPU 5 determines whether the shift-to-off condition is satisfied (step S226). When the shift-to-off condition is not satisfied (NO in the step S226), the CPU 5 waits.

On the other hand, when the shift-to-off condition is satisfied (YES in the step S226), the CPU 5 proceeds with the process to step S222, and sets the DRAM 23 in the self refreshment mode.

In the first embodiment, since the secondary battery 1 is charged in the standby state or the operating state where the conversion efficiency of the power supply circuit 8 is high, the power consumption in the sleep state and the off-state can be kept low. This enables to reduce the total power consumption in the image forming apparatus.

In the first embodiment, since the NIC 61 is stopped when the network communications are unnecessary, the power consumption of the image forming apparatus can be further reduced.

Subsequently, a power control apparatus according to a second embodiment of the present invention will be described.

In the above-mentioned first embodiment, the secondary battery 1 is not charged when the image forming apparatus is in the sleep state. Accordingly, if the rate of the sleep state is significantly high in the image forming apparatus, the electric energy that is enough to back up the DRAM 23 in the off-state may not be charged even if the rapid triple charge is performed by turning on the constant current circuits 2 and 46. Accordingly, when the rate of the sleep state is high in the image forming apparatus, the secondary battery 1 is charged even in the sleep state in the second embodiment.

Figure 6A:
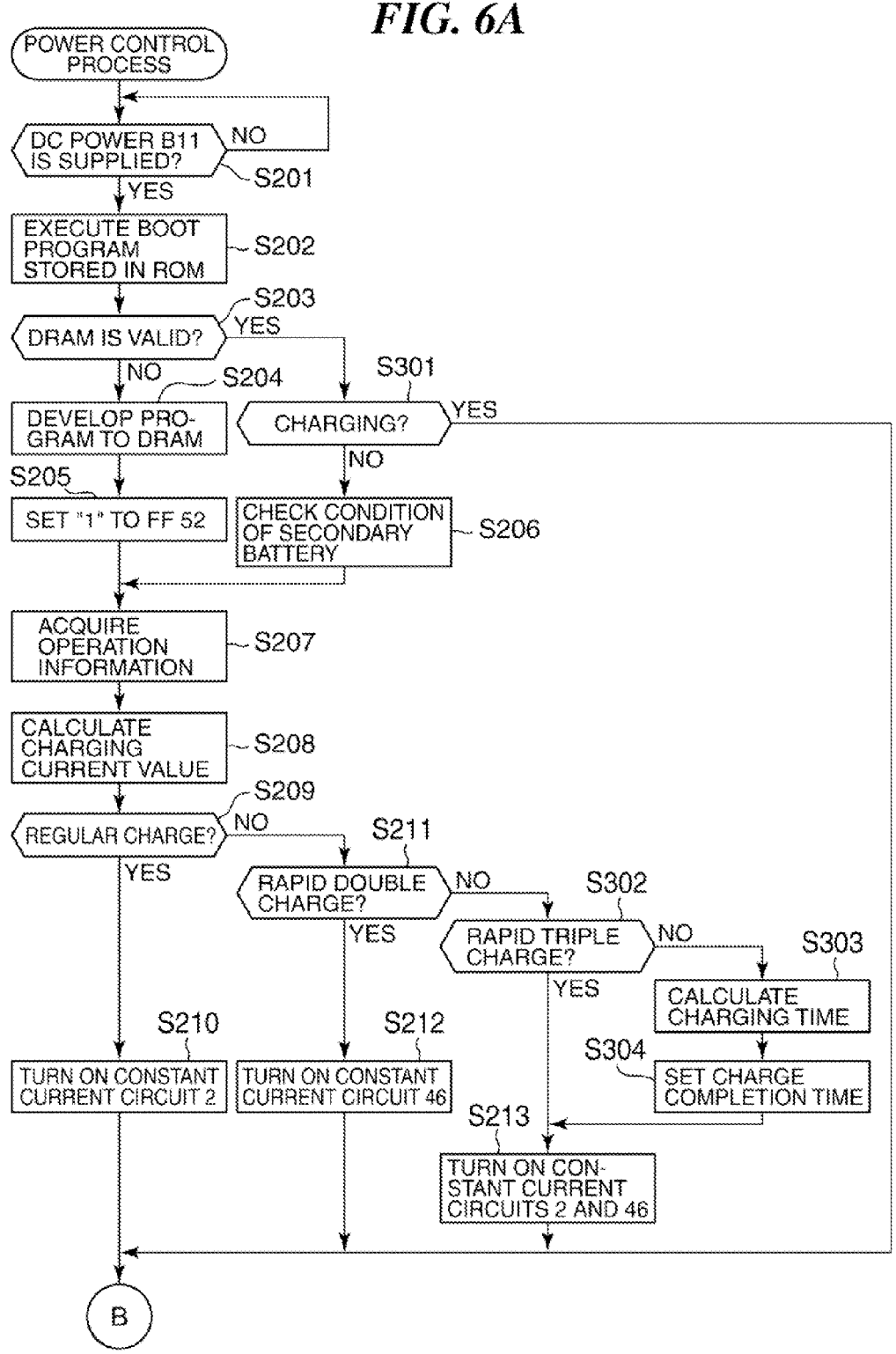
FIG. 6A is a flowchart showing a part of a power control process executed by a CPU in a power control unit included in an information processing apparatus according to a second embodiment of the present invention.
Figure 6B:
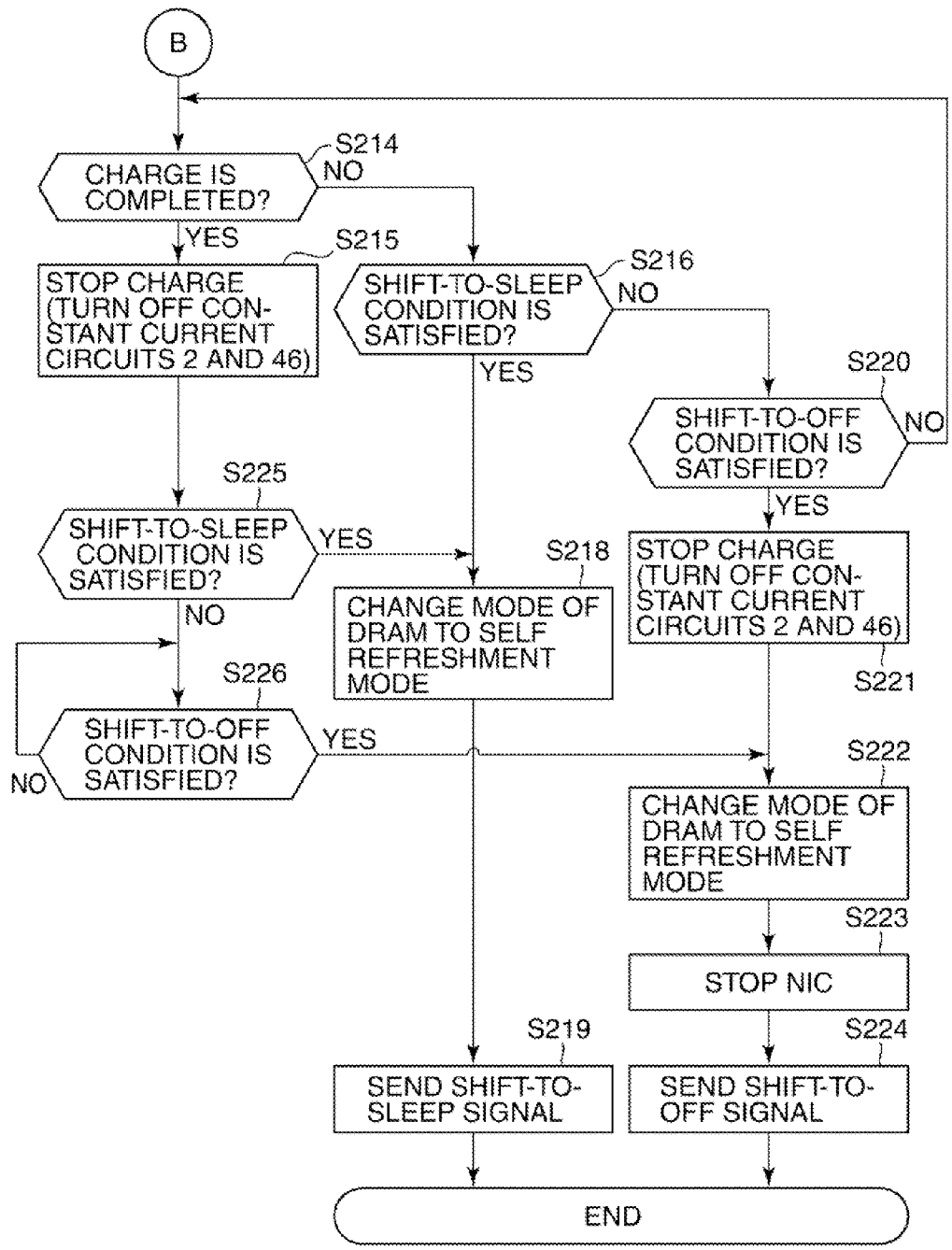
FIG. 6B is a flowchart showing the remaining part of the power control process executed by the CPU in the power control unit included in the information processing apparatus according to the second embodiment of the present invention.

FIG. 6A and FIG. 6B are flowcharts showing an example of a power control process executed by a CPU in a power control unit according to the second embodiment of the present invention. It should be noted that steps in FIG. 6A and FIG. 6B that are identical to the steps in FIG. 5A and FIG. 5B are shown with the identical reference numbers, and duplicated descriptions are omitted.

When determining that the data stored in the DRAM 23 is valid (YES in the step S203), the CPU 5 checks whether at least one of the constant-current-circuit-control signals 12 and 47 is ON in order to determine whether the secondary battery 1 is charging (step S301).

When the secondary battery 1 is charging (YES in the step 301), the CPU 5 proceeds with the process to the step S214, and determines whether the charge of the secondary battery 1 is completed.

On the other hand, when the secondary battery 1 is not charging (NO in the step S301), the CPU 5 proceeds with the process to the step S206, and checks the condition of the secondary battery 1.

When the charging current value is not smaller than the current value of the constant current circuit 46 (NO in the step S211), the CPU 5 compares the charging current value (Icharge) with the total value of the current values of the constant current circuits 2 and 46 (step S302). That is, the CPU 5 determines whether the charging current value is smaller than the total value concerned in order to check whether the rapid triple charge is available.

When the charging current value is smaller than the total value (YES in the step S302), the CPU 5 proceeds with the process to the step S213, and start the rapid triple charge by turning on the constant current circuits 2 and 46.

On the other hand, when determining that the charging current value is not smaller than the total value (NO in the step S302), the CPU 5 calculates charging time (step S303). A condition (4) holds among the charging time (Tcharge), the electric energy (Pbackup) required to back up the DRAM 23, the remaining capacity (Pbat) of the secondary battery 1, and the charging current value (Icharge3) for the rapid triple charge. The CPU 5 calculates the charging time (Tcharge) using the condition (4).

$$Pbackup < Pbat + Icharge3 * Tcharge \quad (4)$$

Then, the CPU 5 performs a timer interrupt setting (a charge completion time setting) to the clock IC 6 according to the charging time (Tcharge) calculated using the condition (4) (step S304), and proceeds with the process to the step S213.

When the shift-to-sleep condition is satisfied (YES in the step S216), the CPU 5 proceeds with the process to the step S218 to set the DRAM 23 in the self refreshment mode without stopping the charge in the second embodiment. As a result, the charge of the secondary battery 1 is continued even when shifting to the sleep state during the charge.

Thus, in the second embodiment, when the rate of the sleep state in the image forming apparatus is significantly high and the enough electric energy cannot be charged in the standby state and the operating state, the charge of the secondary battery 1 is continued when shifting to the sleep state during the charge. As a result of this, the electric energy that is enough to back up the DRAM 23 can be charged.

Although the DC power A10 is used as the power supply for the constant current circuits 2 and 46, the FF 4, and the FF 44 in the above-mentioned embodiments, the DC power B11 may be used instead.

In the above-mentioned embodiments, the capability of the charge unit is controlled by the ON/OFF controls of the two constant current circuits 2 and 46 of which the current values differ mutually. However, the control method is not limited to the ON/OFF control. For example, resistances of the constant current circuits 2 and 46 may be changed to control the capability of the charge unit.

An electrically rewritable nonvolatile memory may be used instead of the ROM employed in the above-mentioned embodiments. The boot program for the CPU 5 may be stored in the nonvolatile memory 57 without using the ROM 55.

The control program and the operation information may be stored in a storage unit like a hard disk instead of the nonvolatile memory 57 that is used to store them in the above-mentioned embodiments.

The operation information may be stored in an external server connected via an interface like a network. In such a case, the image forming apparatus acquires the operation information from the external server by communicating with the external server.

It should be noted that the CPU 5 acquires the conversion efficiency from the power supply circuit 8, and controls the constant current circuit (charge unit) using the conversion efficiency. The CPU 5 acquires the power consumption of the image forming apparatus from a power consumption detection unit (not shown), and controls the constant current circuits (charge units) using the detected power consumption concerned.

The above-mentioned description clearly shows that the power control apparatus consists of the CPU 5, the power supply circuit 8, the sleep control circuit 18, the constant current circuits 2 and 46, the battery voltage detection circuit 9, the A/D converter 48, the secondary battery 1, the DC to DC converter 21, the SW 22, the SW 42, the nonvolatile memory 57, the voltage monitoring IC 50, etc. in FIG. 1.

Then, the CPU 5, the sleep control circuit 18, and the SW 22 function as the power-state-switching unit. The constant current circuits 2 and 46 function as first and second charge units, respectively. The CPU 5 functions as the control unit, too. The A/D converter 48 and the CPU 5 function as a detection unit, and the nonvolatile memory 57 is used as the storage unit. Then, the CPU 5 and the sleep control circuit 18 function as the shift control unit, and the NIC 61 is used as the external interface unit. The CPU 5 is used as the information processing unit in the image forming apparatus.

Although the image forming apparatus is described as an example of an information processing apparatus in the above-mentioned embodiments, the present invention can be applied to another information processing apparatus, such as a personal computer (PC), similarly.

Although the embodiments of the invention have been described, the present invention is not limited to the above-mentioned embodiments, the present invention includes various modifications as long as the concept of the invention is not deviated.

For example, the functions of the above mentioned embodiments may be achieved as a control method that is executed by an information processing apparatus. Moreover, the functions of the above mentioned embodiments may be achieved as a control program that is executed by a computer with which the information processing apparatus is provided. It should be noted that the control program is recorded into a computer-readable storage medium, for example.

In this case, each of the control method and the control program has a power conversion step, a power supplying step, and a charging step at least.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-253903, filed on Nov. 21, 2011, which is hereby incorporated by reference herein in its entirety.

What is claimed is:

1. An information processing apparatus that operates in a first power state, a second power state of which electric energy consumption is smaller than the first power state, or a third power state of which electric energy consumption is smaller than the second power state, comprising:
   a power supply unit configured to supply electric power to devices including first and second devices of the information processing apparatus;
   a secondary battery configured to supply charged power to a part of the devices;
   a power-state-switching unit configured to switch a power state of the information processing apparatus among the first power state in which said power supply unit supplies power to the devices, the second power state in which said power supply unit does not supply power to the first device without supplying power from said secondary battery to the devices, and the third power state in which said secondary battery supplies power to the second device; and
   a control unit configured to control so that said secondary battery is charged by the power supplied from said power supply unit in the first power state, and to control so that active charging of the secondary battery is stopped upon detection of a condition causing a shift to the second power state regardless of a charge state of the secondary battery.

2. The information processing apparatus according to claim 1, wherein the part of the devices to which power is supplied from said secondary battery in the third power state is a volatile memory that stores data used by said control unit.

3. The information processing apparatus according to claim 2, wherein said secondary battery supplies power to the volatile memory in the third power state, and said power supply unit supplies power to the volatile memory in the second power state.

4. The information processing apparatus according to claim 2, wherein said volatile memory holds data in a self refreshment mode in the second power state and the third power state.

5. The information processing apparatus according to claim 1, wherein the first device is said control unit.

6. The information processing apparatus according to claim 1, further comprising:
   a detection unit configured to detect a remaining capacity of said secondary battery, and
   wherein said control unit controls a current value for charging said secondary battery based on the remaining capacity of said secondary battery detected by said detection unit.

7. The information processing apparatus according to claim 1, further comprising:
   a storage unit configured to store working states of the information processing apparatus in the first power state, the second power state, and the third power state, and
   wherein said control unit controls a current value for charging said secondary battery based on the working states stored in said storage unit.

8. The information processing apparatus according to claim 1, further comprising:
   first and second charging units configured to charge said secondary battery using the power supplied from said power supply unit, and
   wherein said control unit controls said first and second charging units so as to charge said secondary battery using one or both of said first and second charging units.

9. The information processing apparatus according to claim 1, further comprising:
   a network interface unit configured to receive data sent from an external apparatus and to send data to an external apparatus, and
   wherein said power supply unit supplies power to said network interface unit in the second power state, and does not supply power to said network interface unit in the third power state.

10. A control method for an information processing apparatus that operates in a first power state, a second power state of which electric energy consumption is smaller than the first power state, or a third power state of which electric energy consumption is smaller than the second power state, the control method comprising:
    supplying electric power to devices including first and second devices of the information processing apparatus from a power supply unit;
    supplying electric power to a part of the devices from a secondary battery that is charged by the power supply unit;
    switching a power state of the information processing apparatus among the first power state in which the power supply unit supplies power to the devices, the second power state in which the power supply unit does not supply power to the first device without supplying power from the secondary battery to the devices, and the third power state in which the secondary battery supplies power to the second device; and
    controlling so that the secondary battery is charged by the power supplied from the power supply unit in the first power state, and controlling so that active charging of the secondary battery is stopped upon detection of a condition causing a shift to the second power state regardless of a charge state of the secondary battery.

11. A non-transitory computer-readable storage medium storing a control program causing a computer to execute a control method for an information processing apparatus that operates in a first power state, a second power state of which electric energy consumption is smaller than the first power state, or a third power state of which electric energy consumption is smaller than the second power state, the control method comprising:
    supplying electric power to devices including first and second devices of the information processing apparatus from a power supply unit;
    supplying electric power to a part of the devices from a secondary battery that is charged by the power supply unit;
    switching a power state of the information processing apparatus among the first power state in which the power supply unit supplies power to the devices, the second power state in which the power supply unit does not supply power to the first device without supplying power from the secondary battery to the devices, and the third power state in which the secondary battery supplies power to the second device; and
    controlling so that the secondary battery is charged by the power supplied from the power supply unit in the first power state, and controlling so that active charging of the secondary battery is stopped upon detection of a condition causing a shift to the second power state regardless of a charge state of the secondary battery.

* * * * *